(12) United States Patent
Yu

(10) Patent No.: US 12,215,261 B2
(45) Date of Patent: Feb. 4, 2025

(54) BORON NITRIDE-PHOSPHOR COMPOSITES, SYSTEMS, AND METHODS

(71) Applicant: The Florida State University Research Foundation, Inc., Tallahassee, FL (US)

(72) Inventor: Zhibin Yu, Tallahassee, FL (US)

(73) Assignee: The Florida State University Research Foundation, Inc., Tallahassee, FL (US)

( * ) Notice: Subject to any disclaimer, the term of this patent is extended or adjusted under 35 U.S.C. 154(b) by 228 days.

(21) Appl. No.: 18/059,711

(22) Filed: Nov. 29, 2022

(65) Prior Publication Data

US 2023/0167356 A1    Jun. 1, 2023

Related U.S. Application Data

(60) Provisional application No. 63/284,383, filed on Nov. 30, 2021.

(51) Int. Cl.
| | |
|---|---|
| *C09K 11/02* | (2006.01) |
| *C08K 3/38* | (2006.01) |
| *C08K 7/00* | (2006.01) |
| *C09K 11/06* | (2006.01) |
| *G01T 3/06* | (2006.01) |

(52) U.S. Cl.
CPC ............... *C09K 11/02* (2013.01); *C08K 3/38* (2013.01); *C08K 7/00* (2013.01); *C09K 11/06* (2013.01); *G01T 3/06* (2013.01); *C08K 2003/385* (2013.01); *C08K 2201/011* (2013.01)

(58) Field of Classification Search
CPC ....... C09K 11/02; C09K 11/06; C09K 11/025; C08K 3/38; C08K 7/00; C08K 2003/385; C08K 2201/011; G01T 3/06
See application file for complete search history.

(56) References Cited

U.S. PATENT DOCUMENTS

| | | | |
|---|---|---|---|
| 2006/0054863 A1* | 3/2006 | Dai | .......................... G21K 4/00 |
| | | | 252/301.4 R |
| 2012/0199747 A1* | 8/2012 | Letant | .................... B82Y 15/00 |
| | | | 250/361 R |

* cited by examiner

*Primary Examiner* — Courtney D Thomas
(74) *Attorney, Agent, or Firm* — Eversheds Sutherland (US) LLP

(57) ABSTRACT

Composite materials that include a phosphor and boron nitride particles. The composite materials may be scintillating materials. The boron nitride particles may be $^{10}B$ enriched particles. Systems that include composite materials and a detector. Methods of detecting or blocking neutrons. Methods of manufacturing composite materials, including large-area composite materials.

20 Claims, 4 Drawing Sheets

BORON NITRIDE-PHOSPHOR COMPOSITES, SYSTEMS, AND METHODS

CROSS-REFERENCE TO RELATED APPLICATIONS

This application claims priority to U.S. Provisional Patent Application No. 63/284,383, filed Nov. 30, 2021, which is incorporated by reference herein.

BACKGROUND

Neutron detectors are important for improving safety, especially during nuclear fuel cycle activities. A number of commercial neutron detectors are available.

Some commercial neutron detectors contain helium-3 gas. Although these detectors enjoy a relatively high efficiency of neutron detection, there is typically a short supply of the helium-3 isotope. Therefore, boron-lined gas-filled proportional detectors have been used to replace helium detectors; however, the detection efficiency of boron-lined gas-filled proportional detectors is much lower than the detection efficiency of the helium-3-based detectors.

A disadvantage of commercial boron-lined proportional neutron detectors is that increasing boron thickness usually is necessary for sufficient neutron absorption. The increase of boron thickness, however, reduces the transport efficiency of the charged particles generated in the devices. As a compromise, boron coatings having an area density of only about 0.5 $mg/cm^2$ (i.e., about 2 μm thick) are used in commercial detectors. These boron coatings, however, usually capture only a small percentage of incident thermal neutrons. For these reasons and others, the commercial detectors may be heavy, require relatively high power consumption, have a relatively low response speed, or a combination thereof.

As alternatives, solid state scintillation detectors and semiconductor detectors have been explored, but these types of detectors are limited by their manufacturing scalability. Due to the fact that absolute detection efficiency of a neutron detector is proportional to its detection area, relatively larger detector sizes may be desirable in stand-off measurements, detecting shielding sources, or coincidence/multiplicity counting.

There remains a need for boron nitride-phosphor composites for neutron detection that are efficient, portable, and/or fast-responding. There also remains a need for boron nitride-phosphor composites that are easy to manufacture, have a large detection area, and/or are cost-effective.

BRIEF SUMMARY

Provided herein are embodiments of boron nitride-phosphor composites, including large-area boron nitride-phosphor composites, and methods of manufacturing boron nitride-phosphor composites that address one or more of the foregoing needs, including composite materials with nanoscale phase separation for efficient thermal neutron detection.

The composite materials provided herein may include large-area composites (e.g., films), which may be produced at relatively low cost. Embodiments of the composite materials may permit a high efficiency of stand-off detection, and imaging of thermal neutrons in at-risk locations, such as in the presence of special nuclear materials and possible nuclear events.

In one aspect, composite materials are provided. In some embodiments, the composite materials include a matrix that includes a phosphor, and particles of boron nitride dispersed in the matrix. The particles of boron nitride may include boron nitride nanotubes, boron nitride nanoparticles, or a combination thereof.

In another aspect, methods of neutron blocking or detection are provided. In some embodiments, the methods include providing a composite material as described herein, and arranging the composite material at a location to capture at least a portion of any thermal neutrons that are present or released at the location. The location, as described herein, may include a location at risk of neutron release or contamination.

In a further aspect, systems for neutron detection are provided. In some embodiments, the systems include a scintillator device that includes a composite material as described herein, and a detector configured to detect light emitted by the composite material. The detector may include a photomultiplier tube. The systems may include one or more other apparatuses, such as a high voltage divider, a pulse amplifier, a pulse discriminator, a digital counter, a multichannel analyzer, a coincidence circuit, a display, a memory configured to store computer-executable instructions, a processor, or a combination thereof.

In yet another aspect, methods of forming composite materials are provided. In some embodiments, the methods include disposing a phosphor and particles of boron nitride in a liquid, and removing at least a portion of the liquid to form the composite material. The composite material may be placed in a mold to form a composite material having a desired shape. In some embodiments, the methods include disposing a phosphor and particles of boron nitride in a mold, such as a heated mold, to form the composite material.

Additional aspects will be set forth in part in the description which follows, and in part will be obvious from the description, or may be learned by practice of the aspects described herein. The advantages described herein may be realized and attained by means of the elements and combinations particularly pointed out in the appended claims. It is to be understood that both the foregoing general description and the following detailed description are exemplary and explanatory only and are not restrictive.

DETAILED DESCRIPTION

Figure 1:
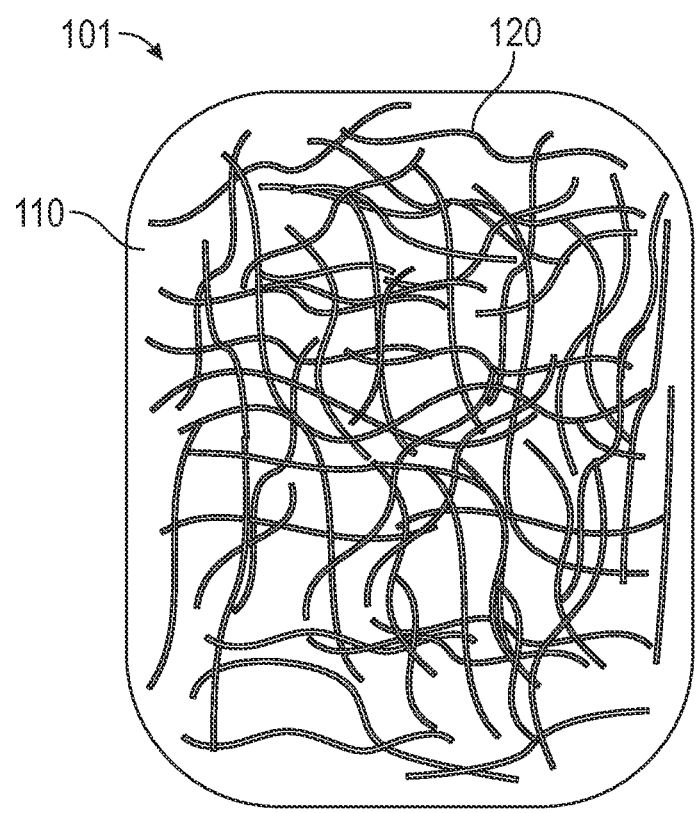
FIG. 1 depicts a schematic of the microscopic morphology of an embodiment of a composite material.

The composite materials provided herein may include a matrix that includes a phosphor, and particles of boron nitride dispersed in the matrix.

In some embodiments, the particles of boron nitride are evenly dispersed in the matrix. In some embodiments, the particles of boron nitride are unevenly dispersed in the matrix. When the particles of boron nitride include nanotubes of boron nitride, the nanotubes may be substantially aligned in the matrix, or randomly oriented in the matrix. For example, the nanotubes are randomly oriented in the embodiment of the composite material depicted at FIG. 1.

The composite materials provided herein generally may be in any form. In some embodiments, the composite materials are in the form of a film. The films may have any surface area. The films also may have any thickness. In some embodiments, the film has a thickness of about 25 µm to about 250 µm, about 50 µm to about 200 µm, about 50 µm to about 150 µm, about 75 µm to about 125 µm, or about 100 µm.

The composite materials generally may include any weight ratio of matrix to particles of boron nitride that is effective for the intended purpose of the composite material, such as neutron blocking or detecting. In some embodiments, the matrix and particles of boron nitride are present in the composite materials at a weight ratio of about 99:1 to about 1:99, about 90:10 to about 10:90, about 80:20 to about 20:80, about 70:30 to about 30:70, or about 60:40 to about 40:60. In some embodiments, the matrix and particles of boron nitride are present in the composite materials at a weight ratio of about 99:1 to about 50:50, about 90:10 to about 50:50, about 80:20 to about 50:50; about 70:30 to about 50:50, or about 60:40 to about 50:50.

The composite materials generally may include any weight percentage of particles of boron nitride that is effective for the intended purpose of the composite material, such as neutron blocking or detecting. In some embodiments, the particles of boron nitride are present at an amount of at least 0.1%, at least 1%, at least 5%, at least 10%, at least 20%, at least 30%, at least 40%, at least 50%, or at least 60%, or at least 70%, by weight, based on the weight of the composite material.

Particles of Boron Nitride

The particles of boron nitride may be nanoscale particles of boron nitride. The nanoscale particles may include boron nitride nanotubes, boron nitride nanoparticles, or a combination thereof.

In some embodiments, the nanoscale particles of boron nitride have an average diameter of about 1 nm to about 500 nm, about 1 nm to about 400 nm, about 1 nm to about 300 nm, or about 100 nm to about 300 nm, as determined by scanning electron microscopy. In some embodiments, the nanoscale particles of boron nitride have an average diameter of about 1 nm to about 200 nm, about 1 nm to about 175 nm, about 1 nm to about 150 nm, about 1 nm to about 125 nm, or about 1 nm to about 100 nm, as determined by scanning electron microscopy.

As used herein, the phrase boron nitride nanotubes refers to a particle having a tube or tube-like structure formed at least in part of boron nitride, and having a nanoscale diameter (i.e., about 0.1 nm to less than 1,000 nm), as determined by scanning electron microscopy.

When the particles of boron nitride include boron nitride nanotubes, the boron nitride nanotubes may be single-wall or multi-walled (e.g., double-walled) nanotubes. The boron nitride nanotubes may have a diameter of about 0.5 nm to about 20 nm, about 0.5 nm to about 15 nm, or about 0.5 nm to about 10 nm, as determined by scanning electron microscopy. The boron nitride nanotubes may have a length of about 0.5 micrometers to about 2 micrometers, or about 1 micrometer to about 2 micrometers.

As used herein, the phrase boron nitride nanoparticles refers to regularly- and/or irregularly-shaped particles having a nanoscale diameter (i.e., about 0.1 nm to less than 1,000 nm), as determined by scanning electron microscopy.

In some embodiments, the particles of boron nitride are $^{10}B$ enriched particles of boron nitride. As used herein, the phase "$^{10}B$ enriched" refers to a material, such as a sample of boron nitride particles, that includes an amount (e.g., mole fraction) of isotope $^{10}B$ that exceeds the natural abundance of isotope $^{10}B$. When boron nitride particles described herein are $^{10}B$ enriched, then the amount of isotope $^{10}B$ may be equal to at least 101% (1.01*X), at least 105% (1.05*X), at least 110% (1.10*X), at least 125% (1.25*X), at least 150% (1.5*X), or at least 200% (2*X) of the natural abundance of $^{10}B$, wherein X is the natural mole-fraction abundance of $^{10}B$.

Matrix

The composite materials provided herein may include a matrix that includes a phosphor. As used herein, the term "phosphor" refers to any solid material that emits light when exposed to one or more types of energy, such as energy imparted by alpha particles, lithium ions, etc.

Not wishing to be bound by any particular theory, it is believed that when the particles of boron nitride of the composite materials capture thermal neutrons, the capture produces, via the capture reaction described in Example 1, lithium ions and alpha particles. The lithium ions and/or alpha particles can interact with the matrix that includes a phosphor, and this interaction produces light, such as low energy photons. The phosphor in embodiments of the composite materials may have a fast radiative decay, which may permit a high counting rate to be achieved in the methods described herein. In view of this likely mechanism, the arrangement of the matrix and particles of boron nitride may be configured, as explained herein, to increase or maximize the likelihood that the lithium ions and/or alpha particles diffuse into, and, therefore, further interact with, a phosphor matrix.

In some embodiments, the phosphor includes phosphor particles. When the phosphor includes phosphor particles, the matrix may include a polymeric material in which the phosphor particles are dispersed. The polymeric material may be a phosphor polymer or a non-phosphor polymer. In some embodiments, the phosphor includes a polymeric phosphor. In some embodiments, phosphor particles are dispersed in the polymeric phosphor.

Non-limiting examples of phosphors include sulfide oxides, sulfides, alkaline earth silicates, alkaline earth silicoaluminates, alkaline earth aluminates, etc. The polymeric phosphor materials may include extended π-π conjugated structures. The polymeric phosphor materials may include a chromophore. The polymeric phosphor materials may include nonconventional luminescent polymers, such as those that do not include classic chromophores, and, instead, include benzene rings that are isolated and/or moieties that are electron rich, such as amines, carbonyls, ethers, imides, heteroatoms, etc.

Methods of Neutron Blocking or Detection

In another aspect, methods of neutron blocking or detection are provided. In some embodiments, the methods include providing a composite material as described herein, and disposing the composite material at a location to capture at least a portion of any thermal neutrons that are present or released at the location.

Figure 2:
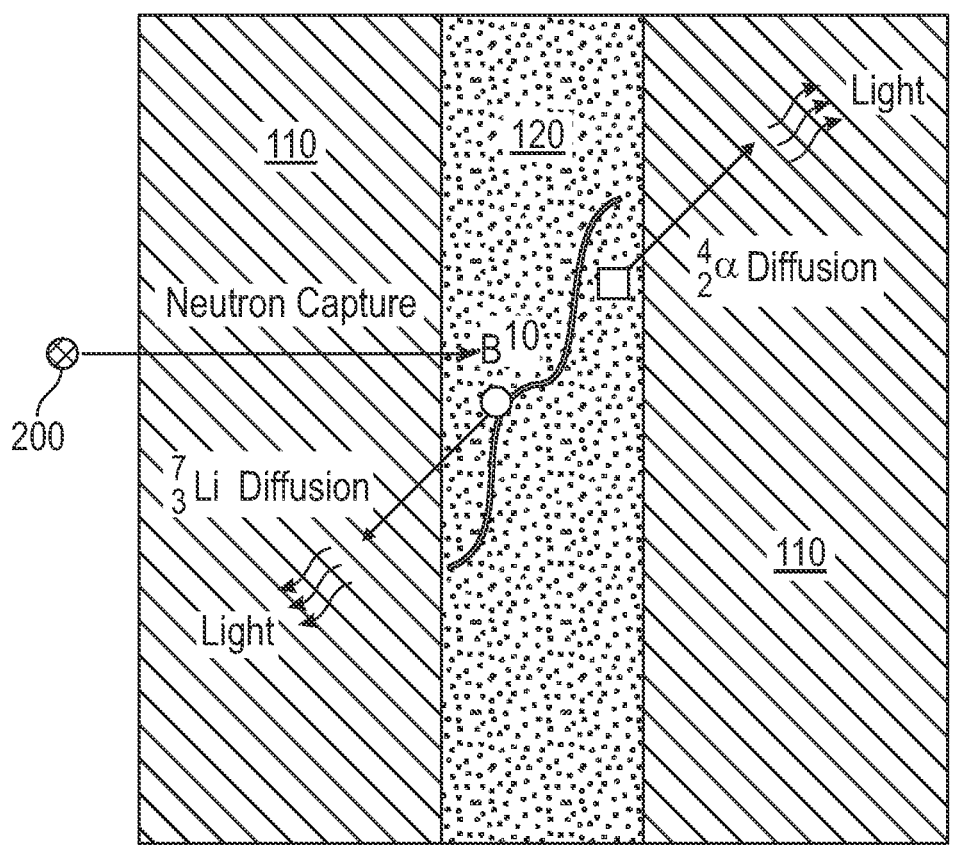
FIG. 2 depicts a possible mechanism of interaction between a neutron and an embodiment of a composite material.

Thermal neutrons are "captured" when their interaction with particles of boron nitride produces one or more lithium ions, one or more alpha particles, or a combination thereof, as depicted, for example, at FIG. 2.

In some embodiments, the composite materials capture at least 80% of thermal neutrons that enter the composite material. In some embodiments, the composite material captures at least 85%, at least 90%, or at least 95% of thermal neutrons that enter the composite material. A neutron "enters" a composite material when it traverses a surface of a composite material.

The location at which a composite material is disposed may include a location at which thermal neutrons are located, or a location at risk of thermal neutron exposure or release. The location may be at, in, or near a nuclear facility, such as a nuclear power plant, a storage area, a fuel disposal site, etc.

The composite materials may be used to block thermal neutrons. Therefore, the composite materials may be used as a protective material. The composite materials, for example, may be used as a shielding material, coating material, etc.

The composite materials may be used to detect thermal neutrons. As used herein, the terms "detect", "detecting", "detection", and the like refer to determining the presence of one or more thermal neutrons, quantifying an amount of thermal neutrons, such as an amount of thermal neutrons that interact with particles of boron nitride, or a combination thereof.

In some embodiments, the methods include providing a detector configured to detect light emitted by the composite material, and detecting with the detector light emitted by the composite material when the composite material captures thermal neutrons. Thermal neutrons, as explained herein, may enter a composite material and interact with particles of boron nitride, which produces lithium ions and/or alpha particles that interact with a phosphor of the matrix to generate photons. The photons may be detectable by the detector.

Systems for Neutron Detection

In yet another aspect, systems for neutron detection also are provided herein. In some embodiments, the systems include a scintillator device that includes a composite material as described herein, and a detector configured to detect light emitted by the composite material.

The detector may include any known photon detector, such as a photomultiplier, a photoconductor, a photodiode, etc. In some embodiments, the detector includes a photomultiplier tube.

In some embodiments, the systems also include a high voltage divider, a high voltage source, a pulse amplifier, a pulse discriminator, a digital counter, a multichannel analyzer, a coincidence circuit, a display, or a combination thereof.

In some embodiments, the systems described herein also include memory configured to store computer-executable instructions; and at least one computer processor configured to access the memory and execute the computer executable instructions to (i) collect, store, generate, and display data, such as data generated by a photomultiplier tube, pulse discriminator, digital counter, or multichannel analyzer, and/or (ii) operate one or more mechanical and electrical components of the system, including a photomultiplier tube, a high voltage source, pulse discriminator, digital counter, multichannel analyzer, confidence circuit, etc.

Figure 3:
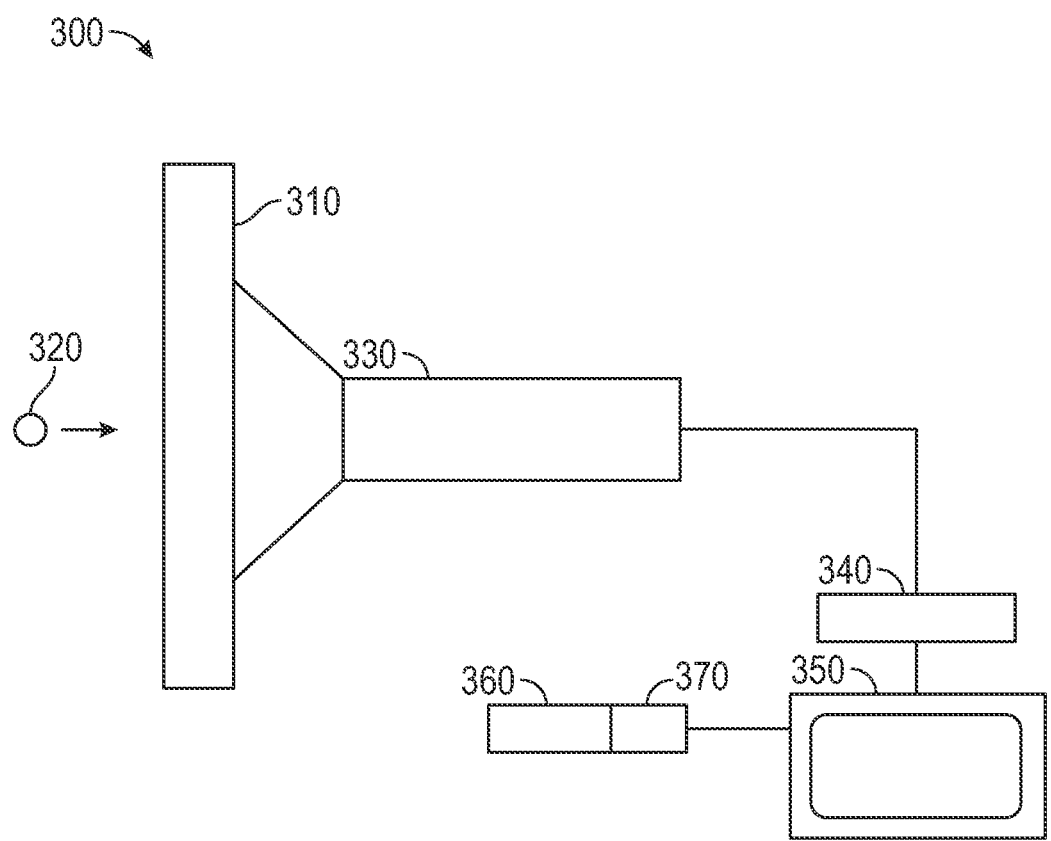
FIG. 3 depicts an embodiment of a system described herein.

FIG. 3 depicts a schematic of an embodiment of a system 300. The system 300 includes a scintillator device 310 that includes a composite material as described herein. The scintillator device 310 may include a frame or other structure that supports a composite material. When a thermal neutron 320 interacts with the composite material of the scintillator device 310, photons are generated, as explained herein, and the photons are detected by the photomultiplier tube 330. The photomultiplier tube 330 and the digital counter 340 may generate data that is analyzed, displayed, and/or stored with the display 350, memory 360, and processor 370. The memory 360 and processor 370 also may be used to control or operate one or more components of the system, such as the photomultiplier tube 330 and digital counter 340. In some embodiments, the digital counter 340 is substituted with a pulse discriminator, a multichannel analyzer, or coincidence circuit.

Methods of Forming Composite Materials

In a still further aspect, methods of forming composite materials are provided. In some embodiments, the methods include disposing a phosphor and particles of boron nitride in a liquid, and removing at least a portion of the liquid. The liquid may be removed by any known technique, including, but not limited to, filtration, heating, etc. After removing the liquid, the phosphor material and the particles of boron nitride may be disposed in a mold, such as a heated mold, to form a composite material having a desired shape. The liquid may be a solvent for one or more components of the composite material. In some embodiments, the liquid is a non-solvent.

In some embodiments, the methods include providing a mixture of a phosphor and particles of boron nitride, and disposing the mixture in a mold. The mold may be heated, as in a compression molding process.

Embodiments of the composite materials described herein may be manufactured using procedures commonly used to produce conventional commodity plastics. Using a liquid-based process or a molding process, embodiments of the composite materials can be made at a relatively low cost, and have a large area, which may facilitate a high efficiency of detection and imaging of thermal neutrons, including in the presence of special nuclear materials and nuclear events.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

While certain aspects of conventional technologies have been discussed to facilitate disclosure of various embodiments, applicants in no way disclaim these technical aspects, and it is contemplated that the present disclosure may encompass one or more of the conventional technical aspects discussed herein.

The present disclosure may address one or more of the problems and deficiencies of known methods and processes. However, it is contemplated that various embodiments may prove useful in addressing other problems and deficiencies in a number of technical areas. Therefore, the present disclosure should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

In the descriptions provided herein, the terms "includes," "is," "containing," "having," and "comprises" are used in an open-ended fashion, and thus should be interpreted to mean "including, but not limited to." When materials, systems, and methods are claimed or described in terms of "comprising" various steps or components, the materials, systems, and methods can also "consist essentially of" or "consist of" the various steps or components, unless stated otherwise.

The terms "a," "an," and "the" are intended to include plural alternatives, e.g., at least one. For instance, the disclosure of "a phosphor", "a liquid", and the like, is meant to encompass one, or mixtures or combinations of more than one phosphor, liquid, and the like, unless otherwise specified.

Various numerical ranges may be disclosed herein. When Applicant discloses or claims a range of any type, Applicant's intent is to disclose or claim individually each possible number that such a range could reasonably encompass, including end points of the range as well as any sub-ranges and combinations of sub-ranges encompassed therein, unless otherwise specified. Moreover, all numerical end points of ranges disclosed herein are approximate. As a representative example, Applicant discloses, in some embodiments, that the film has a thickness of about 90 µm to about 110 µm. This range should be interpreted as encompassing about 90 µm and about 110 µm, and further encompasses "about" each of 91 µm, 92 µm, 93 µm, 94 µm, 95 µm, 96 µm, 97 µm, 98 µm, and 99 µm, 100 µm, 101 µm, 102 µm, 103 µm, 104 µm, 105 µm, 106 µm, 107 µm, 108 µm, and 109 µm, including any ranges and sub-ranges between any of these values.

As used herein, the term "about" means plus or minus 10% of the numerical value of the number with which it is being used.

EXAMPLES

The present invention is further illustrated by the following examples, which are not to be construed in any way as imposing limitations upon the scope thereof. On the contrary, it is to be clearly understood that resort may be had to various other aspects, embodiments, modifications, and equivalents thereof which, after reading the description herein, may suggest themselves to one of ordinary skill in the art without departing from the spirit of the present invention or the scope of the appended claims. Thus, other aspects of this invention will be apparent to those skilled in the art from consideration of the specification and practice of the invention disclosed herein.

Example 1—Preparation of a Composite Scintillator Film

In this example, embodiments of composite scintillator films were prepared, each having different thicknesses and/or different concentrations of nano-sized boron nitrides.

The neutron detectors of this example were composite scintillator thin films that included nano-sized boron nitrides ($^{10}$B enriched) embedded in a phosphor matrix. The nano-sized boron nitrides of this example were nanotubes of boron nitrides, but, as described herein, the nano-sized boron nitrides may include nanotubes, nanoparticles, or a combination thereof.

A schematic of a thin film of this example is depicted at FIG. 1. The composite scintillator thin film 101 of FIG. 1 included $^{10}$B enriched nanotubes of boron nitrides 120 embedded in the phosphor matrix 110. The nanotubes of boron nitrides were substantially evenly dispersed in this example, as depicted by FIG. 1, but other configurations are envisioned. In this example, the separation distances between the nanotubes phase and the phosphor phase were controlled within a sub-micrometer scale.

Not wishing to be bound by any particular theory, it was believed that the composite materials of FIG. 1, when tested, operated according to the mechanism depicted at FIG. 2. FIG. 2 depicts a $^{10}$B enriched nanotube of boron nitride 120 and the phosphor matrix 110 of FIG. 1. When a thermal neutron 200 entered the phosphor matrix 110, the $^{10}$B enriched nanotube of boron nitride 120 captured the thermal neutron, and this capture reaction, as shown in the following equation, produced lithium ions and alpha particles that had a limited mean free path in a solid media.

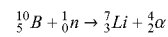

The lithium ions and alpha particles likely had a limited mean free path of about 1 µm to about 2 µm in the solid media.

In view of this likely mechanism, the arrangement of the nano-sized boron nitride phase and the phosphor matrix phase was controlled, such as to a sub-micrometer level. Therefore, the lithium ions and alpha particles that resulted from the foregoing capture of thermal neutrons had almost a 100% chance of diffusing into, and further interacting with, the phosphor matrix.

These interactions likely generated low energy photons (e.g., about 2.5 eV to about 3.0 eV) that could be detected by a photomultiplier tube (PMT) or silicon photomultiplier (SiPM). This approach had the advantage of decoupling neutron absorption and charged particle diffusion, which allowed for the use of greater film thicknesses, while not undesirably deteriorating detection efficiency.

Both the energetic lithium ions and alpha particles that were emitted in opposite directions from the neutron capture reaction were simultaneously collected, due to the fact that the nano-sized boron nitrides were embedded in the phosphor matrix, and at least a portion of the nano-sized boron nitrides were fully "wrapped" by the phosphor matrix.

Therefore, the self-absorption effect observed in boron-lined proportional detectors did not occur, thereby resulting in an even greater detection efficiency in the composite detectors of this example.

In view of the high thermal neutron capture cross section of the $^{10}$B isotope, the composite thin films of this example that had a thickness of about 100 µm captured more than 80% of incident thermal neutrons. Therefore, the thin films of this example were ultra-compact detectors with high detection efficiencies.

Figure 4:
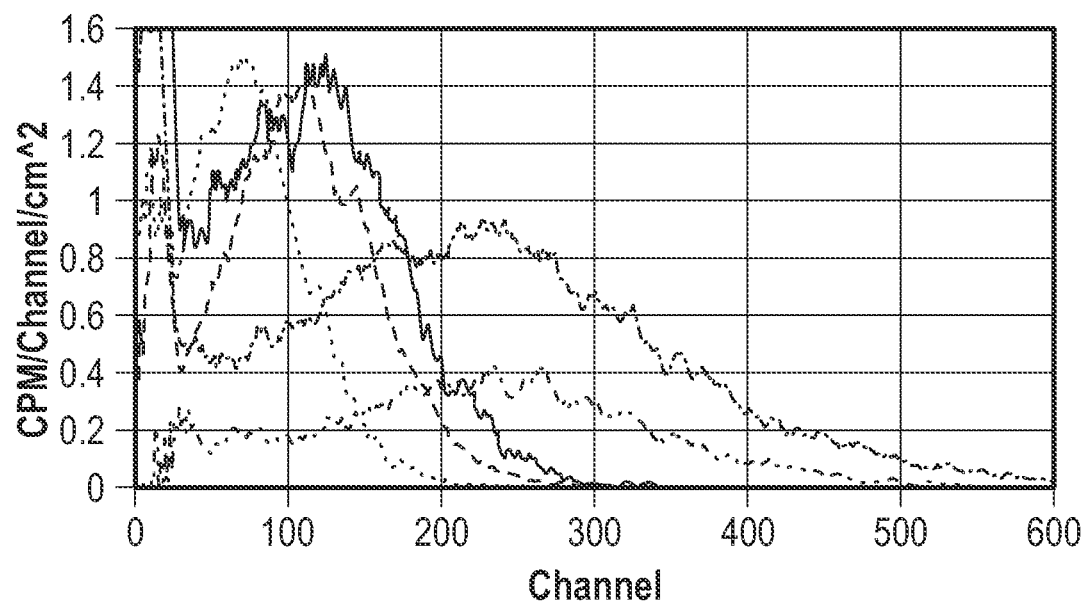
FIG. 4 depicts plots of thermal neutron responses of embodiments of composite materials.
Figure 5:
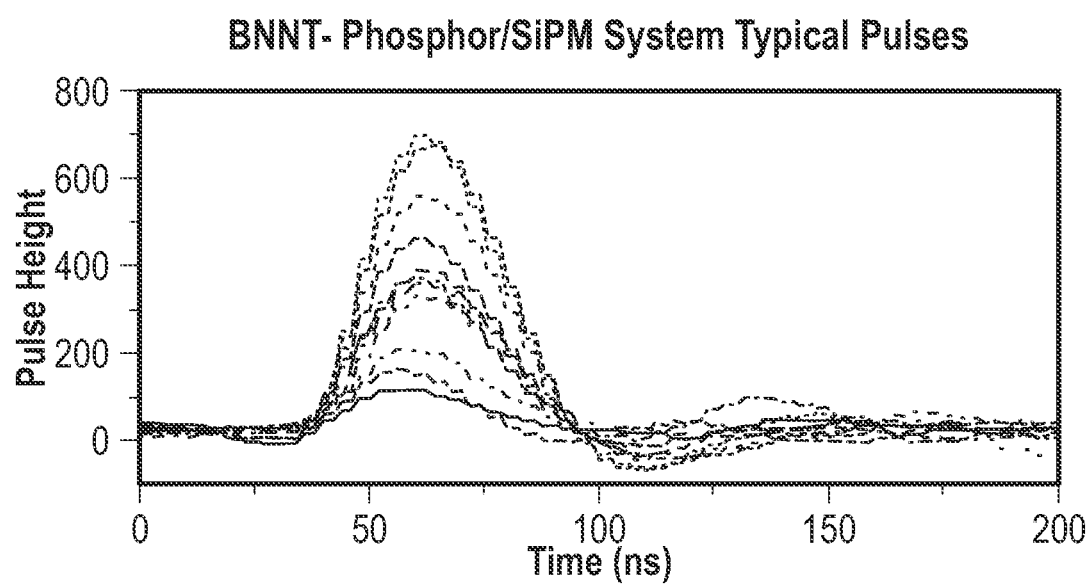
FIG. 5 depicts plots of thermal neutron responses of embodiments of composite materials.

FIG. 4 depicts thermal neutron responses of composite materials of this example, as measured with a photomultiplier tube. FIG. 5 depicts thermal neutron responses of the composite materials of this example, as measured with a silicon photomultiplier tube (SiPM). The results of FIG. 5 demonstrated an ultra-fast response time of about 20 nanoseconds.

That which is claimed is:
1. A composite material comprising:
   a matrix comprising a phosphor; and
   particles of boron nitride dispersed in the matrix;
   wherein the particles of boron nitride comprise boron nitride nanotubes.
2. The composite material of claim 1, wherein the particles of boron nitride are $^{10}$B enriched particles of boron nitride.
3. The composite material of claim 1, wherein the particles of boron nitride are evenly dispersed in the matrix.

4. The composite material of claim 1, wherein the composite material is in the form of a film.

5. The composite material of claim 4, wherein the film has a thickness of about 25 µm to about 250 µm.

6. The composite material of claim 1, wherein the phosphor comprises a polymeric phosphor.

7. The composite material of claim 6, wherein the phosphor further comprises phosphor particles dispersed in the polymeric phosphor.

8. The composite material of claim 1, wherein the phosphor comprises phosphor particles.

9. The composite material of claim 8, wherein the matrix further comprises a non-phosphor polymeric material, and the phosphor particles are dispersed in the non-phosphor polymeric material.

10. The composite material of claim 1, wherein the particles of boron nitride are present at an amount of at least 5%, by weight, based on the weight of the composite material.

11. A method of neutron blocking or detection, the method comprising:
    providing the composite material of claim 1; and
    arranging the composite material at a location to capture at least a portion of any thermal neutrons that are present or released at the location.

12. The method of claim 11, wherein the composite material is in the form of a film having a thickness of about 25 µm to about 250 µm.

13. The method of claim 11, wherein the composite material is configured to capture at least 80% of thermal neutrons that enter the composite material.

14. The method of claim 11, further comprising:
    providing a detector configured to detect light emitted by the composite material; and
    detecting with the detector light emitted by the composite material upon capture of the at least a portion of the thermal neutrons.

15. A system for neutron detection, the system comprising:
    a scintillator device comprising the composite material of claim 1; and
    a detector positioned to detect light emitted by the composite material.

16. The system of claim 15, wherein the detector comprises a photomultiplier tube.

17. The system of claim 16, further comprising a high voltage divider, a pulse amplifier, a pulse discriminator, a digital counter, a multichannel analyzer, a coincidence circuit, a display, a memory configured to store computer-executable instructions, a processor, or a combination thereof.

18. A method of forming a composite material, the method comprising:
    disposing a phosphor and particles of boron nitride in a liquid, wherein the particles of boron nitride comprise boron nitride nanotubes; and
    removing at least a portion of the liquid to form the composite material.

19. The method of claim 18, further comprising disposing the composite material in a mold.

20. A composite material comprising:
    a matrix comprising a phosphor; and
    particles of boron nitride dispersed in the matrix;
    wherein the particles of boron nitride are $^{10}$B enriched;
    wherein the particles of boron nitride comprise boron nitride nanotubes;
    wherein the composite material is in the form of a film having a thickness of about 25 µm to about 250 µm; and
    wherein the particles of boron nitride are present at an amount of about 0.1% to about 70%, by weight, based on the weight of the composite material.

* * * * *